(12) United States Patent
Simpson et al.

(10) Patent No.: US 11,692,877 B2
(45) Date of Patent: Jul. 4, 2023

(54) METHOD AND SYSTEM FOR AXIALLY-OFFSET DIFFERENTIAL INTERFERENCE CONTRAST CORRELATION SPECTROSCOPY

(71) Applicant: Purdue Research Foundation, West Lafayette, IN (US)

(72) Inventors: Garth Jason Simpson, West Lafayette, IN (US); Chen Li, West Lafayette, IN (US); Changqin Ding, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/518,761

(22) Filed: Nov. 4, 2021

(65) Prior Publication Data
US 2022/0057266 A1 Feb. 24, 2022

Related U.S. Application Data (63) Continuation-in-part of application No. 17/329,017, filed on May 24, 2021.
(Continued)

(51) Int. Cl.
*G01J 3/44* (2006.01)
*G01J 3/447* (2006.01)
(Continued)

(52) U.S. Cl.
CPC ............ *G01J 3/447* (2013.01); *G01J 3/021* (2013.01); *G01J 2003/1291* (2013.01); *G01J 2003/4275* (2013.01)

(58) Field of Classification Search
CPC .......... G01J 3/447; G01J 3/032; G01J 3/0224; G01J 3/457
See application file for complete search history.

(56) References Cited

U.S. PATENT DOCUMENTS 10,197,485 B2 * 2/2019 Corbett .............. G01N 15/0211

OTHER PUBLICATIONS

Ding et al., Axially-offset differential interference contrast microscopy via polarization wavefront shaping, Optics Express, vol. 27, No. 4, Feb. 18, 2019.

* cited by examiner

*Primary Examiner* — Rebecca C Bryant
(74) *Attorney, Agent, or Firm* — Piroozi-IP, LLC (57) ABSTRACT

A method for phase contrasting-correlation spectroscopy: converting an incident linearly polarized light into two polarized components (polarized divergent and convergent components, wherein the polarized divergent component is orthogonal to the polarized convergent component), focusing each of the polarized divergent component and the polarized convergent component into a focal plane, thereby producing two focus planes constituting a reference focus (RF) plane and a sample focus (SF) plane; placing a sample at the SF plane and ambient conditions of the sample at the RF plane, resulting in a phase shift between the two polarized components; reconstituting the two phase-shifted polarized components into a phase-shifted linearly polarized light; detecting the phase-shifted linearly polarized light; calculating phase and intensity of the sample from the phase-shifted linearly polarized light; establishing an auto-correlation of phase and intensity of the phase-shifted linearly polarized light; and generating correlograms of intensity and phase of the phase-shifted linearly polarized light.

20 Claims, 9 Drawing Sheets
(6 of 9 Drawing Sheet(s) Filed in Color)

Related U.S. Application Data

(60) Provisional application No. 63/054,801, filed on Jul. 22, 2020.

(51) Int. Cl.
*G01J 3/02* (2006.01)
*G01J 3/427* (2006.01)
*G01J 3/12* (2006.01)

METHOD AND SYSTEM FOR AXIALLY-OFFSET DIFFERENTIAL INTERFERENCE CONTRAST CORRELATION SPECTROSCOPY

CROSS-REFERENCE TO RELATED APPLICATIONS

The present patent application is a continuation-in-part of U.S. Non-Provisional patent application Ser. No. 17/329,017 entitled "AXIALLY-OFFSET DIFFERENTIAL INTERFERENCE CONTRAST CORRELATION SPECTROSCOPY" which was filed May 24, 2021, and is related to and claims the priority benefit of U.S. Provisional Patent Application Ser. No. 63/054,801 filed Jul. 22, 2020 and entitled "AXIALLY-OFFSET DIFFERENTIAL INTERFERENCE CONTRAST CORRELATION SPECTROSCOPY (ADIC-CS)", the contents of each of which are hereby incorporated by reference in its entirety into the present disclosure.

STATEMENT REGARDING GOVERNMENT FUNDING

This invention was made with government support under GM-103401 awarded by the National Institutes of Health; and GM-103910 awarded by the National Institutes of Health. The government has certain rights in the invention.

TECHNICAL FIELD

The present disclosure generally relates to a methods and systems related to spectroscopy, and in particular, to a method and system for axially-offset differential interference contrast correlation spectroscopy.

BACKGROUND

This section introduces aspects that may help facilitate a better understanding of the disclosure. Accordingly, these statements are to be read in this light and are not to be understood as admissions about what is or is not prior art.

Optical microscopy has enabled numerous discoveries by visualizing specimen of interests in biological and materials sciences ever since its invention in 17th century. Despite various unseen microscopic species being studied, it remains a challenge to generate intrinsic contrast from optically thin specimens including living cells, unstained tissues or 2D nanomaterials, due to the weak absorption and scattering from samples. One prior art researcher first tackled this problem by inventing phase contrast microscopy which reveals the intrinsic contrast from transparent structures without staining or tagging utilizing light interference. But the side-lighting nonuniformity and halo-effects complicate the qualitative analysis. Another prior art researcher further developed differential interference contrast (DIC) microscopy, in which linearly polarized light is split to a pair of orthogonal polarized light and focused at either the object or an adjacent reference point, with reduced halos and enhanced contrast.

Unfortunately, both approaches only generate intensity distribution where the phase and amplitude information are nonlinearly entangled and thus cannot be quantitatively retrieved. To address this shortcoming, yet another prior art researcher suggested the use of interferogram information to quantitatively recover the complex optical field, which leads to the modern quantitative phase imaging, in which a beam is split and recombined at an angle such that the focal plane array records an interferogram. Image reconstruction is performed afterwards for phase retrieval. Based on the same physical principles, many other interferometric quantitative phase imaging (QPI) approaches were developed recently. Although the abovementioned QPI methods can provide quantitative phase information with high precision, these interferometric approaches face the common problem of high sensitivity to environmental perturbations (such as mechanical vibrations and temperature changes). These issues arise since the reference beam does not pass through the same optic path of the light coming from the object. In addition, the requirement of reference beam increases the complexity of these QPI systems making them incompatible with retrofitting into existing microscopy systems (i.e., requires a special-purpose module). Furthermore, the images are inherently underdetermined; both phase and intensity must be inferred by image reconstruction rather than directly and independently measured at each pixel. As an alternative, there are a group of non-interferometric approaches such as Fourier ptychography or coherent diffraction imaging that can recover the phase information without a reference beam. However, these above-mentioned methods are based on assumptions on the beam passing through the object and mathematically inferred reference wavefront, which makes both the image acquisition and the post-processing highly time consuming.

Therefore, there is an unmet need for a novel spectroscopy method and arrangement which can recover particle size distributions of nanocrystal suspensions.

SUMMARY

A method for phase contrasting-correlation spectroscopy is disclosed. The method includes converting an incident linearly polarized light into two polarized components. The two polarized components include a polarized divergent component, and a polarized convergent component. The polarized divergent component is orthogonal to the polarized convergent component. The method further includes focusing each of the polarized divergent component and the polarized convergent component into a focal plane, thereby producing two focus planes constituting a reference focus (RF) plane and a sample focus (SF) plane. Furthermore, the method includes placing a sample at the SF plane and ambient conditions of the sample at the RF plane, thereby allowing the two polarized components to be incident on the RF and the SF planes, resulting in a phase shift between the two polarized components. The method in addition includes reconstituting the two phase-shifted polarized components into a phase-shifted linearly polarized light. Further, the method includes detecting the phase-shifted linearly polarized light by a detector, and calculating phase and intensity of the sample from the phase-shifted linearly polarized light. Additionally, the method includes establishing an autocorrelation of phase and intensity of the phase-shifted linearly polarized light, and generating correlograms of intensity and phase of the phase-shifted linearly polarized light.

A phase contrasting-correlation spectroscopy system is also disclosed. The system includes a first micro-retarder array adapted to convert a linearly polarized incident light into two polarized components. The two polarized components include a polarized divergent component, and a polarized convergent component. The polarized divergent component is orthogonal to the polarized convergent component. The system also includes a first optical device adapted to focus each of the polarized divergent component and the polarized convergent component into a focal plane, thereby producing two focus planes constituting a reference focus (RF) plane and a sample focus (SF) plane, wherein placement of a sample in the SF plane and placement of the sample's ambient environment in the RF plane result in a phase shift between the two components. Furthermore, the system includes a second optical device adapted to receive and focus phase-shifted components from the RF and SF planes. The system additionally includes a second microretarder array adapted to combine the two focused phase-shifted components, thereby producing a second phase-shifted linearly polarized light. The system also includes a detector adapted to receive the phase-shifted linearly polarized light. Additionally, the system includes a processing system which is configured to calculate phase and intensity of the sample from the phase-shifted linearly polarized light, establish an autocorrelation of phase and intensity of the phase-shifted linearly polarized light, and generate correlograms of intensity and phase of the phase-shifted linearly polarized light.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel spectroscopy method and arrangement are disclosed herein which can recover particle size distributions of nanocrystal suspensions by producing and coherently recombining light from a pair of axially-offset focal planes. Towards this end, two foci separated by a distance $\Delta z$ according to the relation $\Delta z \cong 2f_{obj}^2/f$ can be generated. For a microretarder array designed with f=6.28 m, the displacement ranged from 0.8 μm for a 100× objective to 500 μm for a 4× objective, produced through polarization wavefront shaping using a matched pair of custom-designed microretarder arrays is thus realized.

Prior to discussing the specifics of the novel method and arrangement for axially-offset differential interference contrast correlation spectroscopy (hereinafter referred to as ADIC-CS), general principals of the ADIC-CS are presented. As discussed above, protein crystallization approaches and X-ray diffraction have enabled numerous discoveries in structural biology during the past century. However, the increasing difficulties of obtaining large protein single crystals result in the rising trend of using smaller and smaller protein crystals in serial crystallography. Such change is introducing new challenges to the protein structure analysis pipelines including the increasing demand to pre-screen samples to discriminate between ordered protein nanocrystals and disordered aggregates prior to analysis at x-ray free electron lasers facilities. Thus the ADIC-CS disclosed herein has been actually reduced to practice to address such challenges by enabling a sensitive phase contrast correlation spectroscopic measurement.

Figure 1A:
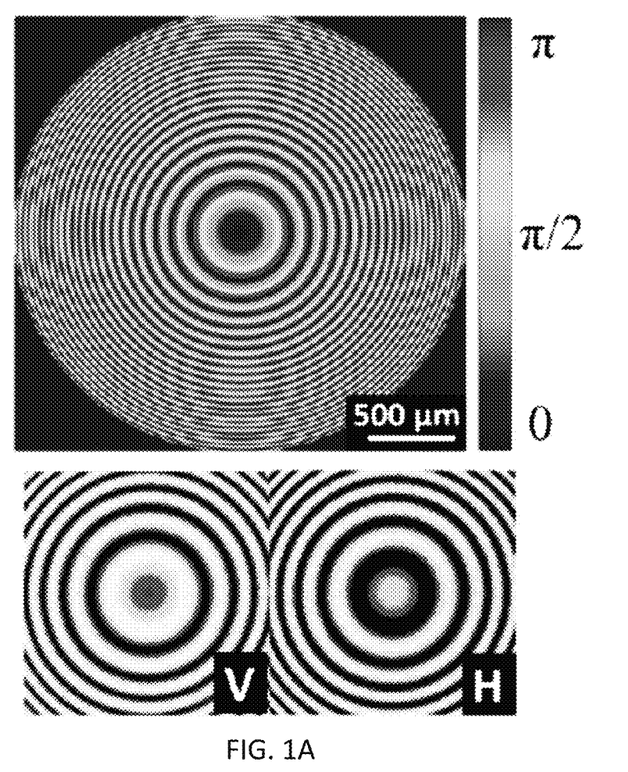
FIG. 1A represents the measured intensity patterns based on a set of microretarder arrays (pRA), showing no artifacts from the periodicity inherent in the pRA design.
Figure 1B:
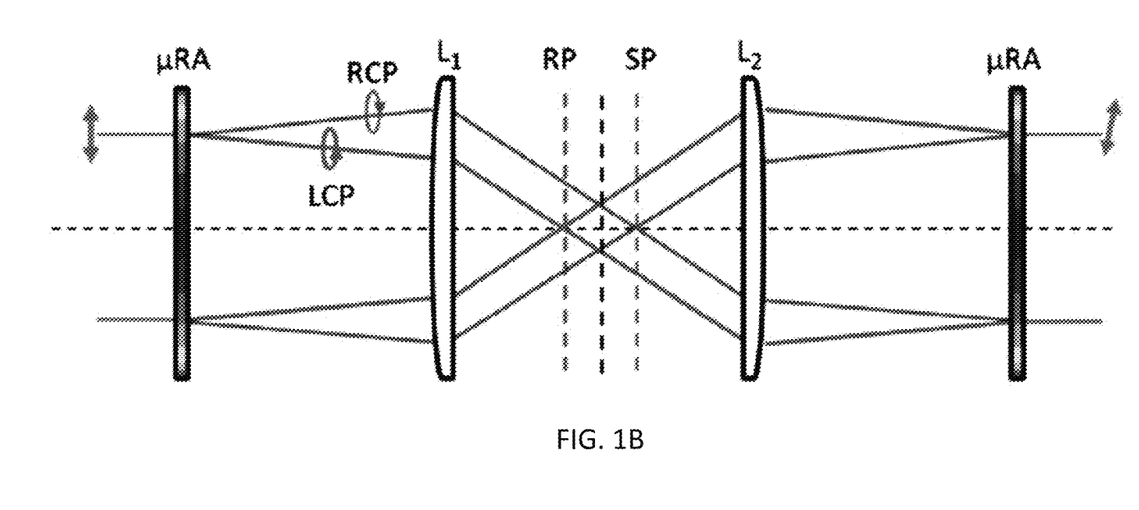
FIG. 1B is a schematic which shows the working principle of an axially-offset differential interference contrast (ADIC) microscope setup, in which L1 and L2 represent lenses; RP represents a reference plane; and SP represents a sample plane.

ADIC-CS was developed as an alternative approach to nanoparticle analysis in fluidic medium via polarization wavefront shaping by a matched pair of micro-retarder arrays (μRAs). With reference to FIG. 1A, measured different intensity distribution of light with different polarization states passing through the pRA is shown. As shown, the scale bar represents 500 μm. The design of pRA represent half-wave retardance with spatially varied azimuthal orientation of the fast-axis which are targeted for 532 nm light. The panels marked as H and V represent measured different intensity distribution with horizontal and vertical polarization detection, respectively, when horizontally polarized light passes through the pRA. The working principle of an ADIC microscope is shown in FIG. 1B. Additional detail regarding the working principle of ADIC is further found in U.S. Pat. No. 11,009,456 to Simpson et al., incorporated by reference in its entirety into the present disclosure. In FIG. 1B, L1 and L2 represent lenses; RP represent the reference plane; and SP represents the sample plane. The polarization pattern resulting from the pRA is substantially identical to that produced by the interference between a slightly diverging right circularly polarized plane wave and a slightly converging left circularly polarized plane wave. The schematic of the ADIC arrangement shown in FIG. 1B is provided with two focus planes (represented as RP and SP) initially generated and then recombined (reconstituted) by the two μRAs. The first μRA splits the incident light into right circularly polarized (RCP) light and left circularly polarized (LCP) light, while the second μRA reconstitutes the RCP light and the LCP light into a linearly polarized light. The longitudinal dash line represents optic axis (z-axis). This patterned wavefront consequently focuses the two orthogonally polarized components (RCP and LCP) into two different axially offset foci. Based on the design of the µRA, the two focus planes are separated in the direction of the optic axis (z-axis) in which the light is transporting. In absence of the sample, the two orthogonal polarized components are coherently recombined as linearly polarized plane wave after passing through another matched µRA such that no photons are detected at the cross-polarized orientation. With sample in one of the two foci, phase change and scattering will change the polarization of the recombined beam, producing photon signals at the detector. Thus, as shown in FIGS. 1A and 1B, in ADIC, the two focus planes serve as the sample and reference planes, respectively.

It should be noted that the ADIC design shown in FIG. 1B is different than the traditional Nomarski phase contrast microscope in which due to absence of the µRA, there is only one focal plane (i.e., the sample plane and reference plane are the same, and the sample is placed in that one single plane). In this traditional Nomarski phase contrast microscope, before and after the lenses (L1 and L2), are Nomarski prisms.

Phase differences between the sample and reference planes result in rotation of the plane of polarized light and incomplete extinction through crossed polarizers. Nanoparticles diffusing through the sample plane give rise to fluctuations of the intensities when measured in this configuration. By rapid polarization modulation of the incident light, detection of the harmonics of the transmitted beam can enable absolute phase determination during nanoparticle diffusion through the sample focal volume. Accordingly, autocorrelograms (i.e., the relationship between an autocorrelation of a time-series representing intensity or phase modulation of the incident light vs. time lags) can then be retrieved from both strategies (including half-wave plate rotation and lock-in-amplification detection in independent measurements) for simultaneous retrieval of transmittance (real component of the image) and quantitative phase (imaginary component) images.

Figure 2A:
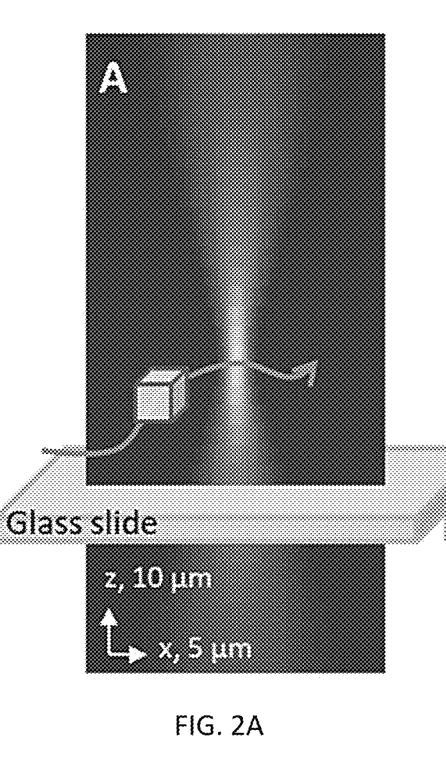
FIGS. 2A and 2B are schematic representations of modified measured point spread functions in the x-z plane without (FIG. 2A) and with (FIG. 2B) the μRA installed in the beam path, clearly showing the two focus planes in FIG. 2B vs. the single focus plan in FIG. 2A.
Figure 2B:
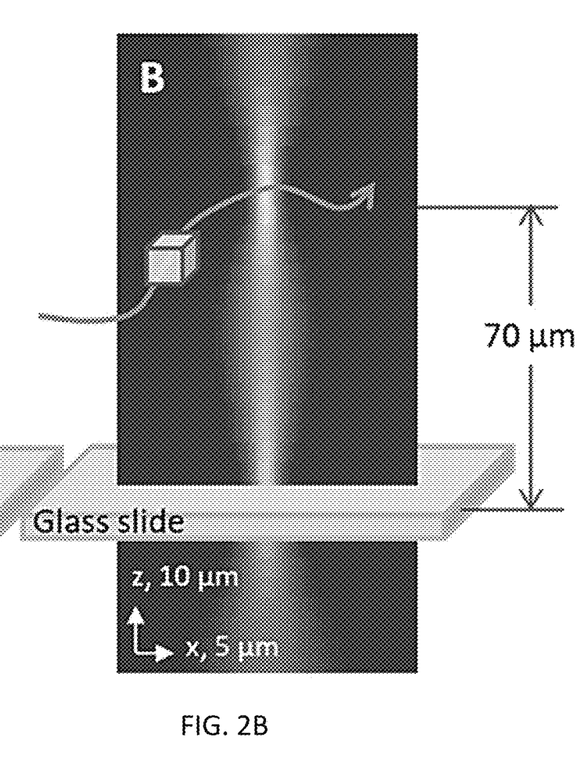

With reference to FIGS. 2A and 2B, schematic representations of modified measured point spread functions in the x-z plane without (FIG. 2A) and with (FIG. 2B) the pRA installed are provided in the beam path, clearly showing the two focus planes in FIG. 2B vs. the single focus plan in FIG. 2A. For ADIC-CS measurement, the glass slide was placed in the reference plane (RP), signals arise while particles going through the sample plane (SP) which is about 70 µm apart from the reference plane, as shown in FIG. 2B; compared with the traditional measurements in which glass slide is off the focus while particles going through the focus plane. FIG. 2B shows how the two focus planes distributed in the z-axis with the existence of the µRA in the optic path compares with the traditional approach of focus imaging method (shown in FIG. 2A). In the design of µRA, the reference plane and sample plane were separated in a distance of 70 µm with a 10× objective. For ADIC-CS measurement, the reference focus plane is placed in a uniform medium, such as a glass slide, as shown in FIG. 2B. Particles diffusing through the sample focal volume give rise to fluctuations of the phase-contrast intensities measured in cross or quadrature. The recorded autocorrelogram is then used to recover the size distribution of nanoparticles in probability density function after post processing. This method utilizes the intrinsic phase contrast mechanism arising from differences in refractive index to achieve label-free sensitive particle analysis.

Figure 3A:
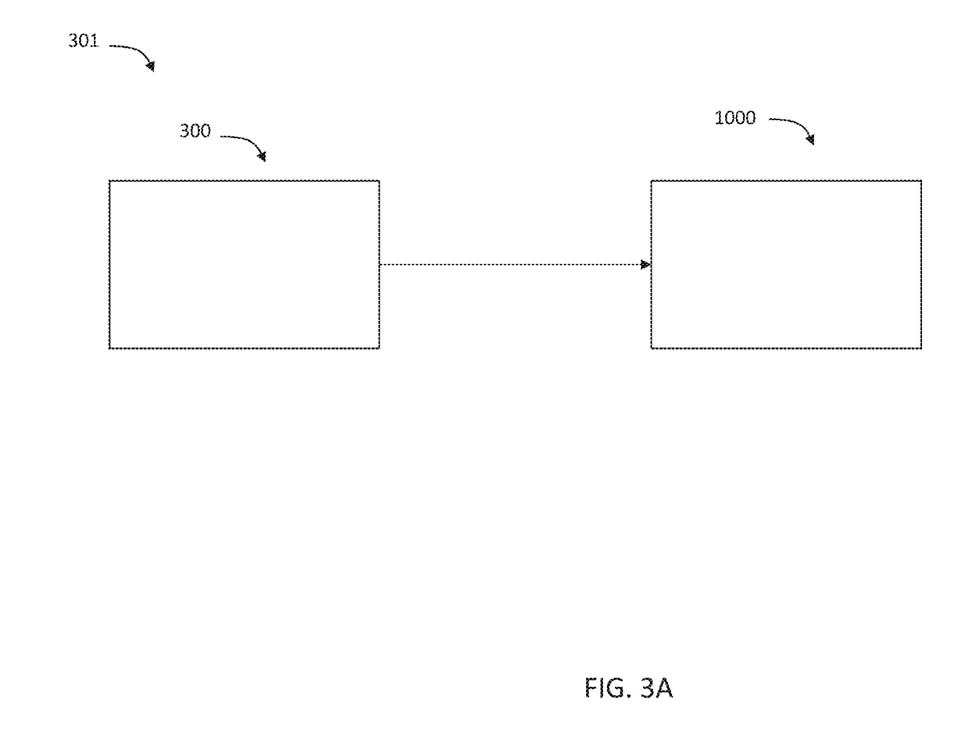
FIG. 3A is a block diagram of an embodiment of the ADIC correlation spectroscopy (ADIC-CS), according to the present disclosure, including an ADIC microscope setup and a computer system.

Referring to FIG. 3A, a block diagram of an embodiment of an ADIC-correlation spectroscopy (ADIC-CS) system 301, according to the present disclosure is provided. The system 301 includes an ADIC microscope system 300, further described with reference to FIG. 3B, and a computer system 1000, further described with reference to FIG. 5. Information is exchanged between the ADIC microscope system 300 and the computer system 1000.

Figure 3B:
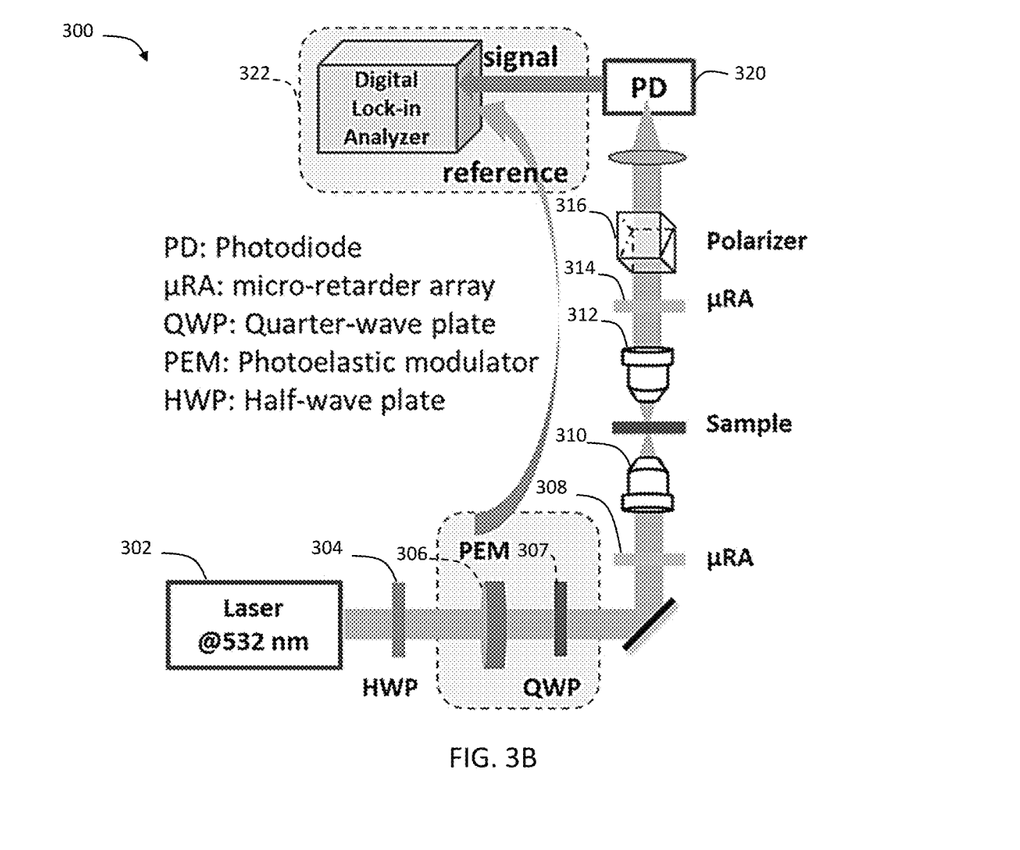
FIG. 3B is a schematic of the ADIC microscope setup.

An ADIC microscope was constructed based on a bright field microscope frame with the addition of several polarizing optics, as illustrated in FIG. 3B, a schematic of an ADIC microscope system 300. In brief, a 532 nm continuous laser 302 (MILLENIA VS J) was used for illumination, followed with a half wave plate 304 (HWP) inserted in a rotation stage for linearly polarization modulation of the incident light. The incident light beam sourced from the continuous laser 302 was expanded to 15 mm in diameter by a beam expander (not shown) so that it filled about half area of a first µRA 308 and the full aperture of a first 10× objective 310 (NIKON). The average laser power on the sample was about 5 mW. A second identical 10× objective 312 was used as condenser in transmittance to recover the expanded beam size so that wave front was recovered to the same polarization states as the incident light after a second pRA 314. A photodiode 320 (THORLABS DET-10A) was used as the detector with a polarizer (DPP-25B, THORLABS) in front to pass the horizontal polarized light. Signals from the photodiode were digitized at 20 kHz using a PCI-E digitizer oscilloscope cards (ALAZARTECH ATS-9462) and remapped into 200×200 images via custom software (MATLAB). Polarization modulation measurements were conducted via mechanical rotation of the HWP 304 from 0 to 90 degrees with 3 degree intervals. For the fast polarization modulation coupled with Lock-in-Amplifier (LIA) 322 (STANFORD RESEARCH SYSTEMS SR810) detection, a photoelastic modulator 306 (PEM HINDS INSTRUMENT PEM-90M) followed with a quarter wave plate 307 (QWP) were installed into the beam path between the HWP 304 and the beam expander (not shown). The low refractive index (fast) axes of the HWP 304 and QWP 307 were rotated to 22.5° and 45°, respectively, to make sure that the incident light became rapidly modulated linearly polarized light before entering the first pRA 308. The PEM 306 was operating at 50 kHz, with both 1f (50 kHz) and 2f (100 kHz) outputs delivered as the reference signals to the LIA 322. Both the quadrature and in-phase components of the LIA output were acquired simultaneously. The integration time for LIA was set as 30 µs. A 3-dimension translational stage was used to place the sample at beam focus. Crossed (vertically) polarized transmittance was detected by passing the beam through a polarizer 316 and the photodiode 320. The intensity tracking traces were digitized at 1 kHz with duration time of 15 min.

It should be appreciated that the first pRA, the first objective (also referred to herein as an optical device) 310, the second objective 312, and the second pRA are matched so that when a particle in its ambient environment is placed at the SF plane (which is axially separated from the RF plane), the two orthogonal components are phase shifted. If, however, no sample particle is present at SF plane (i.e., the SF and RF planes are occupied with the same ambient condition), as discussed above, then no phase-shift results in the two orthogonal components.

The recovered quantitative phase (QP) images agreed well between the two strategies (including half-wave plate rotation and lock-in-amplification detection in independent measurements) with a phase range from $-\pi$ to $\pi$ and a detection limit of 0.033 radian. A series of masks with varied thickness were made through photolithography resources at a fabrication facility. Silica microbeads were used to investigate the refractive index with an agreement between the measurement and the refractive index of amorphous bulk silica. QP images in tissue section samples were measured by using the ADIC microscopy arrangement shown in FIG. 3B.

Figure 4A:
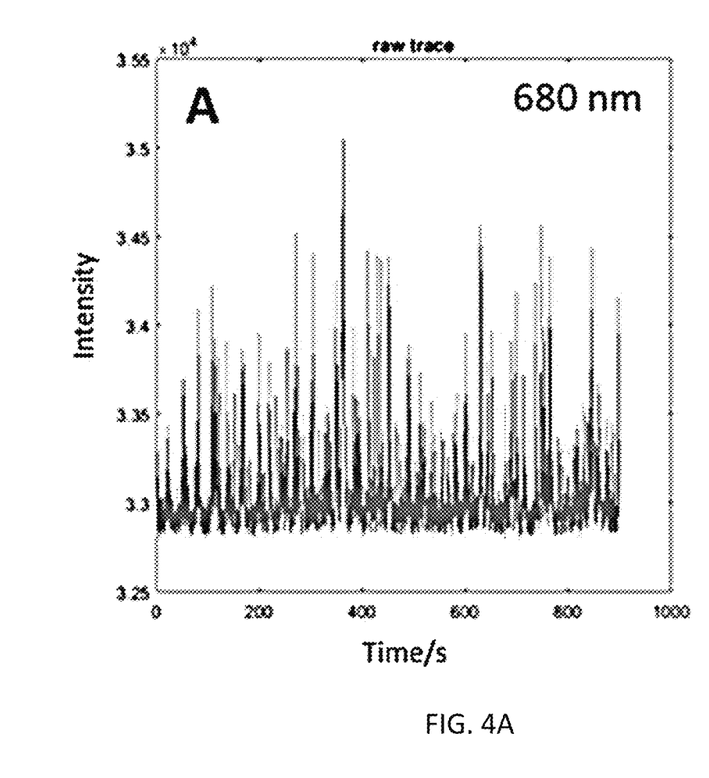
FIGS. 4A and 4B are two raw intensity traces vs. time in seconds for 680 nm and 1.5 μm silica beads suspension measurements as samples placed in the ADIC setup of FIG. 3A.
Figure 4B:
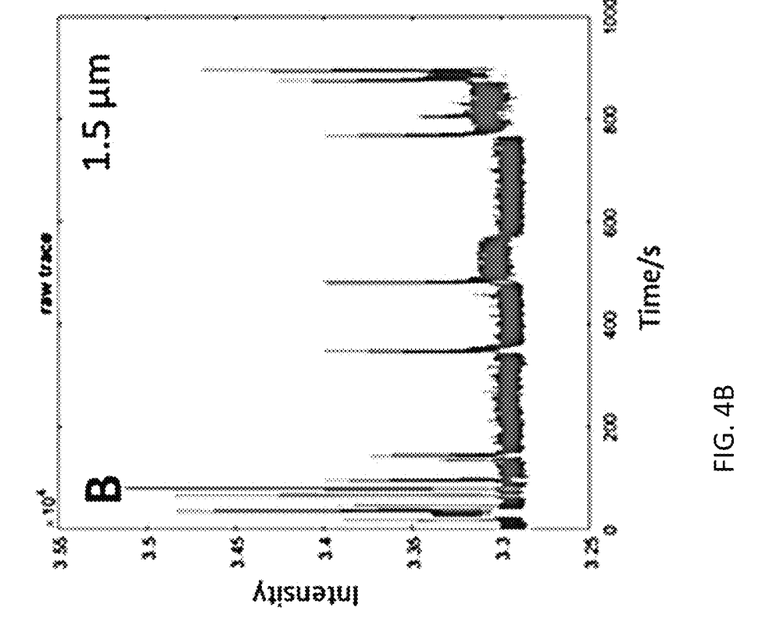
Figure 4C:
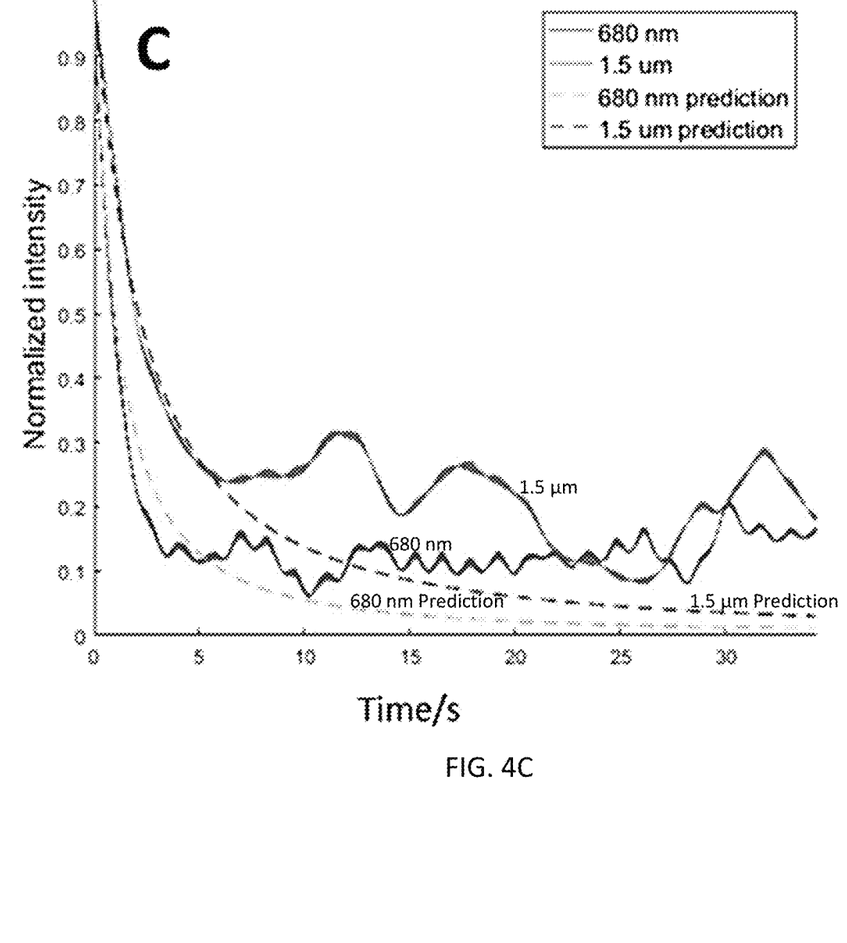
FIG. 4C is a correlation spectroscopy which exhibits difference between results obtained from the two beads suspensions of FIGS. 4A and 4B.

Intensity correlation spectroscopy was then achieved with horizontal polarized incidence and vertically polarized detection via an example data-processing system 1000 shown in FIG. 5, described further below. Referring to FIGS. 4A and 4B, two raw intensity traces for 680 nm and 1.5 μm silica beads suspension measurements, as provided. The correlation spectroscopy retrieved in FIG. 4C exhibits difference between results obtained from the two beads suspensions. The decay coefficient is larger for smaller beads, as would be expected empirically. The measurement results are plotted with the prediction based on Eq. (1), in which the normalized intensity G of the temporal autocorrelogram of the suspension for three-dimensional free diffusion is as a function of timer and characteristic diffusion time $\tau_d$.

$$G(\tau, \tau_d) = A \cdot \left(1 + \frac{\tau}{\tau_d}\right)^{-1} \cdot \left[1 + \left(\frac{w_0}{w_z}\right)^2 \frac{\tau}{\tau_d}\right]^{-\frac{1}{2}} + B, \quad (1)$$

where A and B are the amplitude and asymptotic values of the autocorrelogram, respectively, as $\tau$ approach $\infty$, $w_0$ and $w_z$ (both set to 2 μm) are the beam waist in the radial and axial directions (resolution), respectively. Parameters A and B are set as 1 and 0 in this simulation for the normalized autocorrelogram. The value of $\tau_d$ is related to the particle diameter d as described in Eq. (2).

$$\tau_d = \frac{3\pi\eta w_0^2 d}{4k_B T}, \quad (2)$$

where η is the viscosity of water at 25° C. The predicted results are shown in FIG. 4C in dash lines, which have agreement with the measurements (solid lines). The fluctuation for the asymptotic value in measurement results is caused by electronic noise or insufficient sampling. The retrieved quantitative phase information and particle size distribution can be utilized to calculate the absolute refractive index of nanoparticles being measured, which is not accessible through conventional particle analysis method such as dynamic light scattering.

Figure 5:
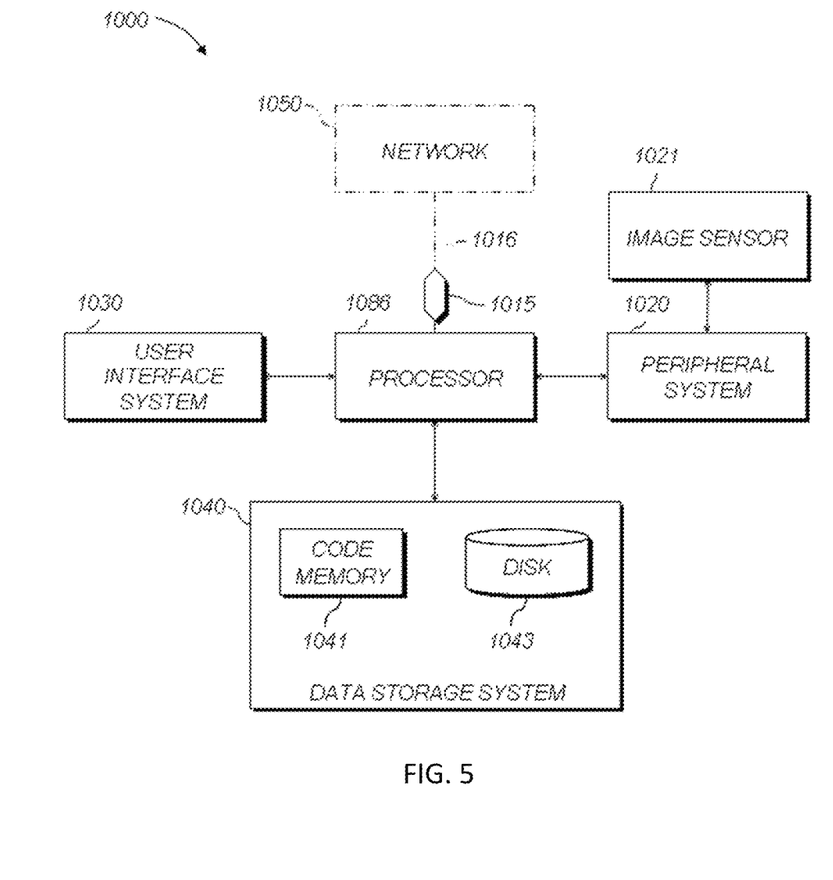
FIG. 5 is a schematic example of a computer system of FIG. 3A that can interface with the ADIC system of FIG. 3B.

Referring to FIG. 5, an example of a computer system 1000, shown in FIG. 3A, is provided that can interface with the ADIC system 300 of FIG. 3B. Referring to FIG. 5, a high-level diagram showing the components of an exemplary data-processing system 1000 for analyzing data and performing other analyses described herein, and related components is provided. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Figure 6:
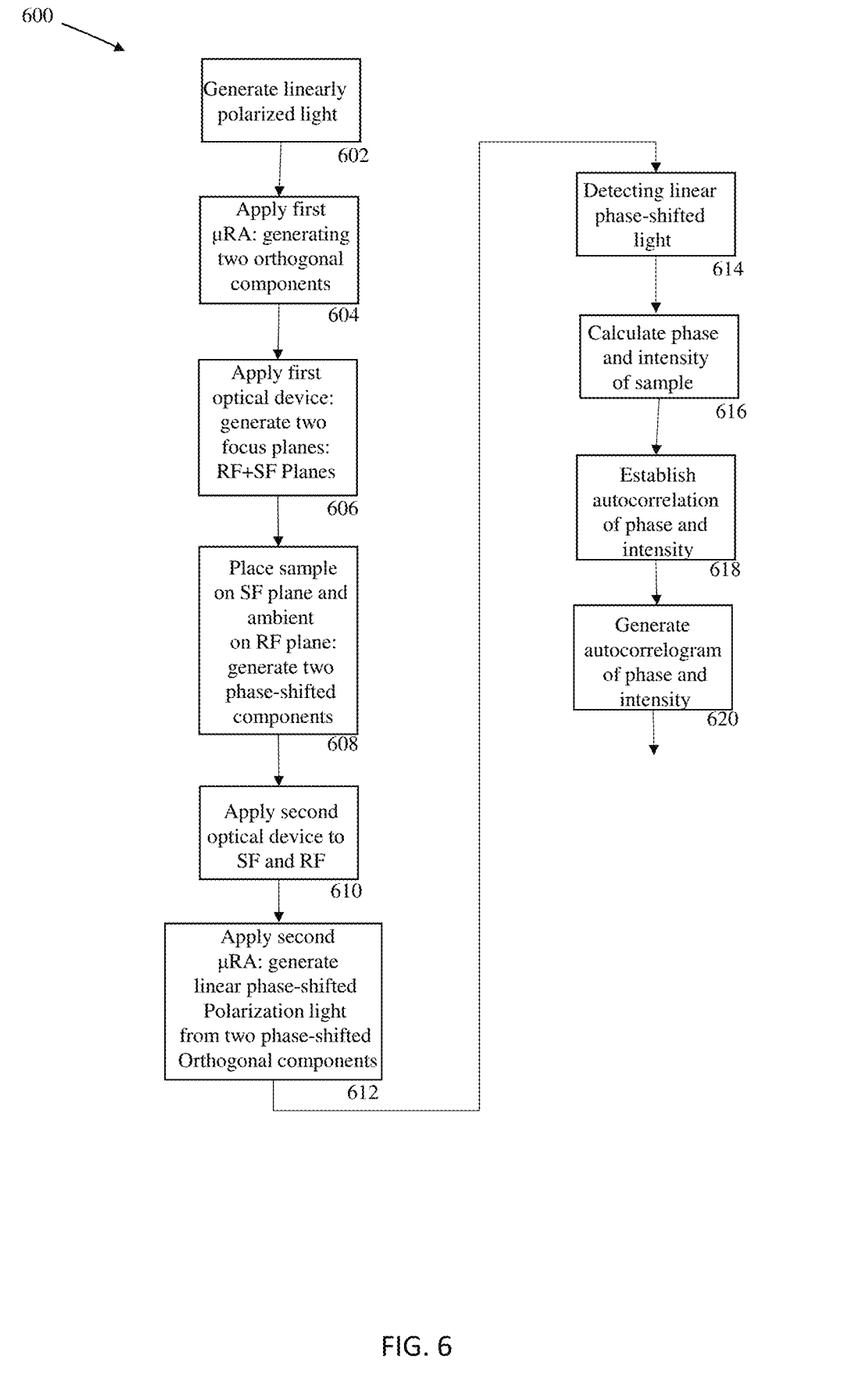
FIG. 6 is a flowchart is shown depicting the steps of a method according to one embodiment of the present disclosure.

Referring to FIG. 6, a flowchart is shown depicting the steps of a method 600 according to one embodiment of the present disclosure. The method 600 begins with generating a linearly polarized light, e.g., from a laser or a light emitting diode, as shown in step 602. Next, the method 600 proceeds to applying a first micro-retarder array to the linearly polarized light to thereby generate two orthogonal components (e.g., by generating a right and left circular polarization), as shown in step 604. Next, the method 600 proceeds to applying a first optical device which is adapted to focus the two orthogonal components onto two focus planes (reference focus (RF) plane and sample focus (SF) plane) which are axially separated, as shown in step 606. Next, a sample is placed in the SF plane while the ambient conditions of the sample (e.g., fluid in which the sample is provided) is placed in the RF plane, as shown in step 608. The two orthogonal components incident on the sample and the ambient conditions of the sample thus generate two phase-shifted components. Next, the method 600 proceeds to apply a second optical device and reconstitute the two phase-shifted components into a phase-shifted linearly polarized light, as shown in steps 610 and 612. Next the phase-shifted linearly polarized light is detected, e.g., by a photodiode, and an electronic signal commensurate with the phase-shifted linearly polarized light is thus generated, as shown in step 614. Next, the method 600 proceeds to calculating phase and intensity of the sample from the detected signal, as shown in step 616. Thereafter, a computer system establishes an autocorrelation of the phase and intensity of the calculated phase and intensity of the sample as shown in step 618. Next, the method 600 proceeds to generating autocorrelogram of phase and intensity, as shown in step 620.

Those having ordinary skill in the art will recognize that numerous modifications can be made to the specific implementations described above. The implementations should not be limited to the particular limitations described. Other implementations may be possible.

The invention claimed is:
1. A method for phase contrasting-correlation spectroscopy, comprising:
converting an incident linearly polarized light into two polarized components, wherein the two polarized components comprise:
a polarized divergent component, and
a polarized convergent component, wherein the polarized divergent component is orthogonal to the polarized convergent component;
focusing each of the polarized divergent component and the polarized convergent component onto a focal plane, thereby producing two focus planes constituting a reference focus (RF) plane and a sample focus (SF) plane;
placing a sample at the SF plane and placing a fluid constituting the ambient conditions of the sample at the RF plane, thereby allowing the two polarized components to be incident on the RF and the SF planes, resulting in a phase shift between the two polarized components, thus generating two phase-shifted polarized components;
reconstituting the two phase-shifted polarized components into a phase-shifted linearly polarized light;
detecting the phase-shifted linearly polarized light by a detector;

calculating phase and intensity of the sample from the phase-shifted linearly polarized light;

establishing an autocorrelation of phase and intensity of the phase-shifted linearly polarized light; and generating correlograms of intensity and phase of the phase-shifted linearly polarized light, wherein the autocorrelation of phase and intensity is based on:

$$G(\tau, \tau_d) = A \cdot \left(1 + \frac{\tau}{\tau_d}\right)^{-1} \cdot \left[1 + \left(\frac{w_0}{w_z}\right)^2 \frac{\tau}{\tau_d}\right]^{-\frac{1}{2}} + B,$$

where A and B are the amplitude and asymptotic values of the autocorrelogram as $\tau$ approaches infinite, and $$\tau_d = \frac{3\pi\eta w_0^2 d}{4 k_B T},$$

where $w_0$ and $w_z$ are the beam waist in the radial and axial directions (resolution), respectively, and $\eta$ is the viscosity of water at 25° C.

2. The method of claim 1, wherein the detector comprises a single channel photo-diode, and a lock-in amplifier.

3. The method of claim 1, wherein the incident linearly polarized light is emitted from a laser device.

4. The method of claim 1, wherein the incident linearly polarized light is emitted from a light emitting diode (LED).

5. The method of claim 1, wherein the focusing is performed by a first optical device.

6. The method of claim 5, wherein the step of converting is performed by a first micro-retarder array, and the step of reconstituting is performed by a second optical device followed by a second micro-retarder array.

7. The method of claim 6, wherein the first and second micro-retarder arrays each comprises: a patterned substrate, wherein the substrate comprises a liquid crystal polymer.

8. The method of claim 7, wherein the liquid crystal polymer comprises a half-wave retardance material.

9. The method of claim 8, wherein the patterned substrate comprises a plurality of concentric circles.

10. The method of claim 9, wherein each concentric circle of the plurality of concentric circles is a different orientation of a fast axis of the half-wave retardance material.

11. The method of claim 1, wherein the two polarized components comprise a divergent right circular polarized light component and a converging left circular polarized light component.

12. A phase contrasting-correlation spectroscopy system comprising:

a first micro-retarder array adapted to convert a linearly polarized incident light into two polarized components, the two polarized components comprise:
a polarized divergent component, and
a polarized convergent component, wherein the polarized divergent component is orthogonal to the polarized convergent component;

a first optical device adapted to focus each of the polarized divergent component and the polarized convergent component into a focal plane, thereby producing two focus planes constituting a reference focus (RF) plane and a sample focus (SF) plane, wherein placement of a sample in the SF plane and placement of the sample's ambient environment in the RF plane result in a phase shift between the two components;

a second optical device adapted to receive and focus phase-shifted components from the RF and SF planes;

a second micro-retarder array adapted to combine the two focused phase-shifted components, thereby producing a second phase-shifted linearly polarized light;

a detector adapted to receive the phase-shifted linearly polarized light; and a processing system configured to:
calculate phase and intensity of the sample from the phase-shifted linearly polarized light,
establish an autocorrelation of phase and intensity of the phase-shifted linearly polarized light, and
generate correlograms of intensity and phase of the phase-shifted linearly polarized light,
wherein the autocorrelation of phase and intensity is based on:

$$G(\tau, \tau_d) = A \cdot \left(1 + \frac{\tau}{\tau_d}\right)^{-1} \cdot \left[1 + \left(\frac{w_0}{w_z}\right)^2 \frac{\tau}{\tau_d}\right]^{-\frac{1}{2}} + B,$$

where A and B are the amplitude and asymptotic values of the autocorrelogram as $\tau$ approaches infinite, and $$\tau_d = \frac{3\pi\eta w_0^2 d}{4 k_B T},$$

where $w_0$ and $w_z$ are the beam waist in the radial and axial directions (resolution), respectively, and $\eta$ is the viscosity of water at 25° C.

13. The system of claim 12, wherein the detector comprises a single channel photo-diode, and a lock-in amplifier.

14. The system of claim 12, wherein the incident lineally polarized light is emitted from a laser device.

15. The system of claim 12, wherein the incident linearly polarized light is emitted from a light emitting diode (LED).

16. The system of claim 12, wherein each of the first and second micro-retarder arrays comprises: a patterned substrate, wherein the substrate comprises a liquid crystal polymer.

17. The system of claim 16, wherein the liquid crystal polymer comprises a half-wave retardance material.

18. The system of claim 17, wherein the patterned substrate comprises a plurality of concentric circles.

19. The system of claim 18, wherein each concentric circle of the plurality of concentric circles is a different orientation of a fast axis of the half-wave retardance material.

20. The system of claim 12, wherein the two polarized components comprise a divergent right circular polarized light component and a converging left circular polarized light component.

* * * * *